United States Patent [19]

Allison et al.

[11] 4,082,305
[45] Apr. 4, 1978

[54] AUXILIARY AXLE ASSEMBLY

[76] Inventors: Blaine H. Allison, Charles Dr.; Richard F. Allison, Oak Harbor Cir., both of Gainesville, Ga. 30501

[21] Appl. No.: 705,146

[22] Filed: Jul. 14, 1976

[51] Int. Cl.² ............................................. B60G 17/00
[52] U.S. Cl. ............................... 280/81 R; 280/43.23; 280/704
[58] Field of Search .............. 280/81 R, 80 R, 112 R, 280/43.23, 43.19, 6 H, 676, 698, 702, 704, 705, 711, 712, 713, 724; 267/15 A; 180/24.02

[56] References Cited

U.S. PATENT DOCUMENTS

| 2,712,856 | 7/1955 | MacPhee | 180/24.02 X |
| 2,941,816 | 6/1960 | Benson | 280/713 |
| 3,133,745 | 5/1964 | Granning | 280/112 R |
| 3,502,348 | 3/1970 | Bellamy et al. | 280/712 |
| 3,689,102 | 9/1972 | Granning | 280/112 R |
| 3,694,001 | 9/1972 | Goodman | 280/712 |
| 3,704,896 | 12/1972 | Buelow | 280/704 |
| 3,713,663 | 1/1973 | Granning | 280/112 R |

Primary Examiner—Kenneth H. Betts
Attorney, Agent, or Firm—B. J. Powell

[57] ABSTRACT

A liftable auxiliary axle assembly for a wheeled vehicle including an auxiliary support frame assembly connected to the vehicle frame; a pair of spaced apart torque arms pivoted on the auxiliary frame assembly about a common pivot axis so that the rear end of each is pivotally movable in a generally vertical plane; a pair of axle seat assemblies mounted on the rear ends of the torque arms for pivoting movement therewith and mounting a wheel and axle assembly therebetween; and a positioning mechanism for selectively lifting the wheel and axle assembly from the road.

16 Claims, 10 Drawing Figures

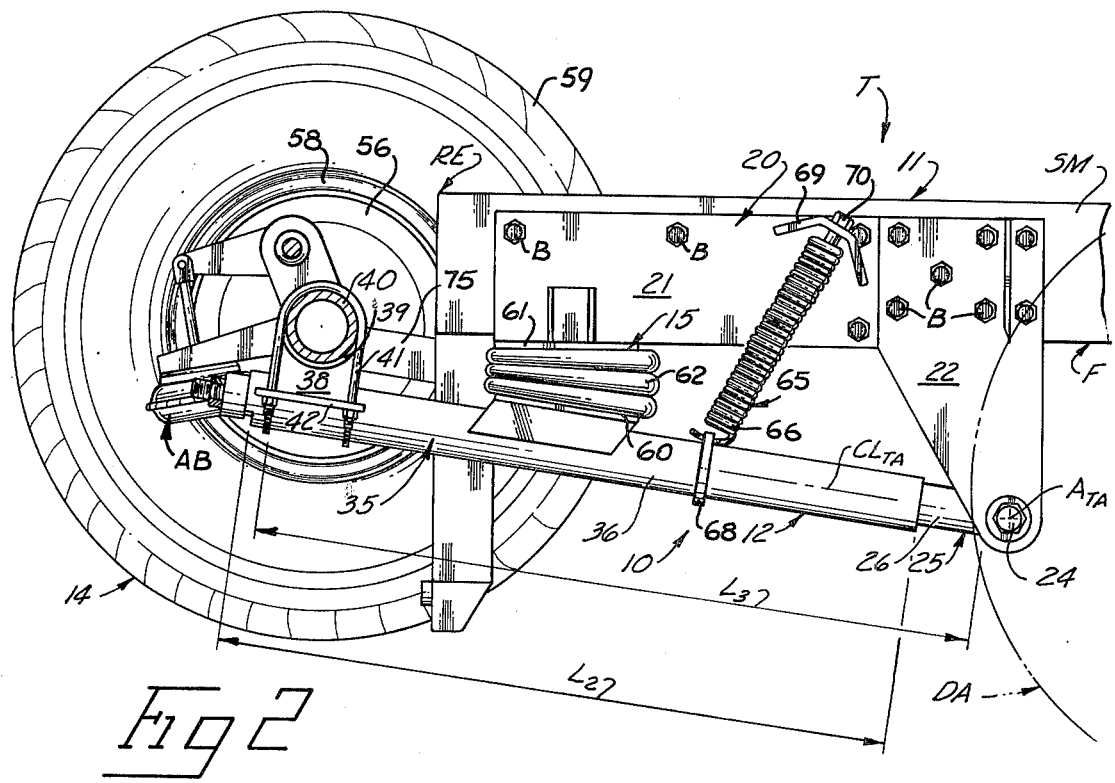
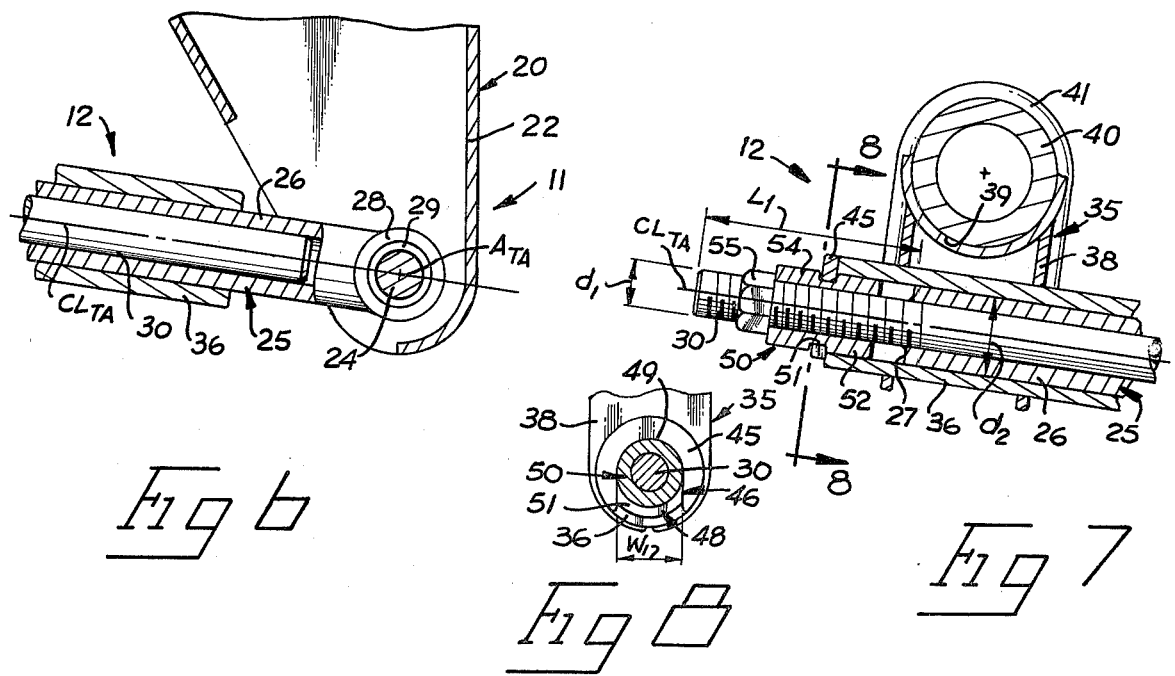

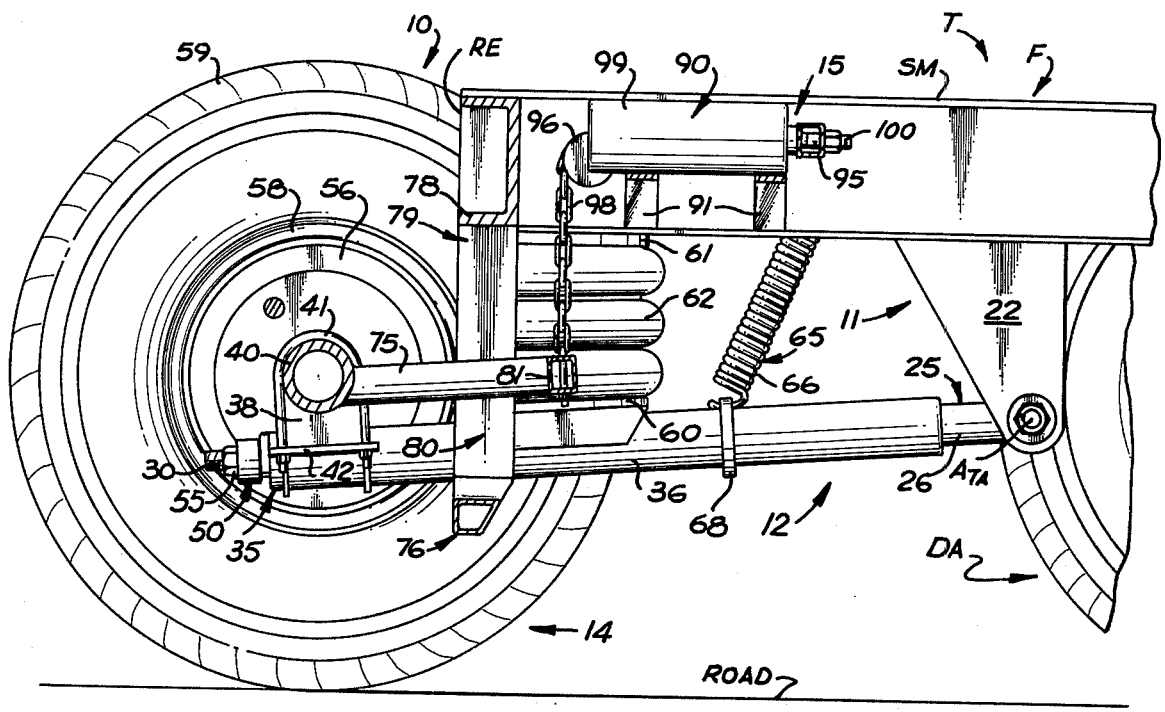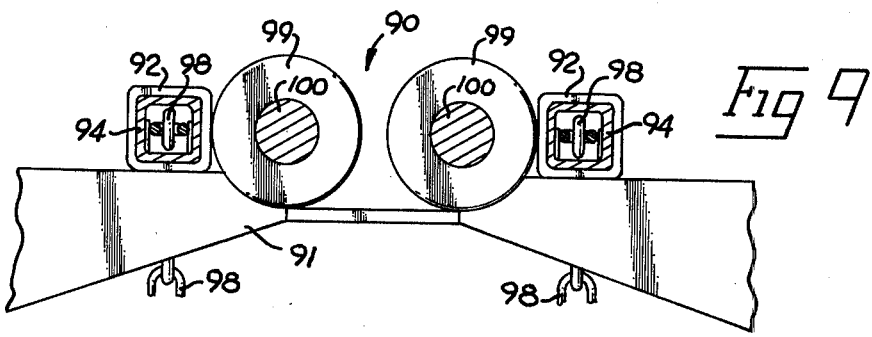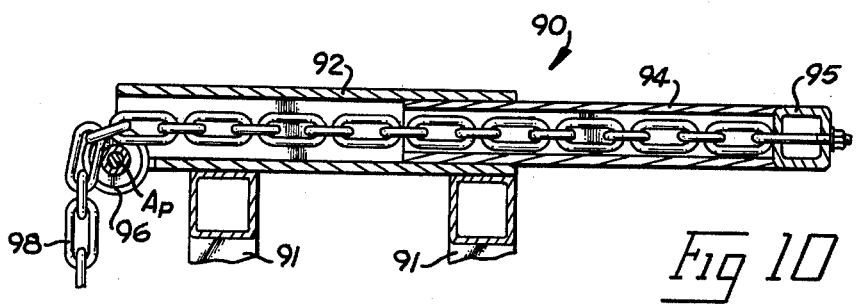

AUXILIARY AXLE ASSEMBLY

BACKGROUND OF THE INVENTION

Because it is frequently desirable to increase the load carrying capacity of a vehicle without increasing the maximum permissable load on each wheel and tire assembly of the vehicle as regulated by state law, auxiliary axle assemblies have been provided. A number of different auxiliary axle assemblies are presently available for the mounting on such vehicles. Usually, these auxiliary axle assemblies have the capability of being lifted from the road when the maximum permissable load for each wheel and tire assembly already provided on the vehicle is not exceeded. These liftable auxiliary axles are usually provided on various kinds of trucks where such trucks travel for a significant portion of the time during their use in an unloaded condition. One type of liftable auxiliary axle assembly is illustrated in U.S. Pat. Nos. 3,133,745; 3,325,181; 3,689,102; 3,713,663; and 3,747,948. A different type of liftable auxiliary axle assembly is illustrated in U.S. Pat. No. 3,502,348. Both of these types of liftable auxiliary axle assemblies suffer from common problems. One of these problems is that it is a relatively complex and time consuming matter to adjust the alignment of the auxiliary axle with respect to the vehicle. Another common problem with these auxiliary axle assemblies is that the springing of the auxiliary axle and also the lifting of the axle is provided by air bag type springs which are subject to failure and also relatively expensive to replace. Another problem associated with such prior art axle assemblies is that the amount the axle can be lifted from the roadway is limited by the vehicle frame.

SUMMARY OF THE INVENTION

These and other problems and disadvantages associated with the prior art liftable auxiliary axle assemblies are overcome by the invention disclosed herein by providing a liftable auxiliary axle assembly which is easily adjustable for alignment between the auxiliary axle and the vehicle, which is capable of being mounted on different width vehicle frames without fishplating the frame to connect the auxiliary axle to the frame, where the auxiliary axle lift is not limited by the vehicle frame and where the auxiliary axle is lifted without the use of the air bag springs.

The apparatus of the invention includes generally an auxiliary axle assembly with an auxiliary support frame connectable to the vehicle frame and which is adjustable to accept different vehicle frame widths. A pair of spaced apart torque arm assemblies are pivotally mounted on the auxiliary support frame about a common pivot axis generally normal to the vehicle axis so that the torque arm assembly moves in a generally vertical plane. The projecting ends of the torque arm assemblies each carry a seat assembly which mounts the auxiliary axle and the air bag spring with the other end of the air bag spring connected to the auxiliary support frame to spring the torque arm and seat assembly. The seat assemblies are axially movable along each of the torque arms and postitively connected to the torque arm so that alignment of the auxiliary axle is simplified. A lifting mechanism is provided for lifting the extending ends of the torque arm as well as the auxiliary axle independently of the air bag springs. The auxiliary axle can be located rearwardly of the vehicle frame so that the vehicle frame does not limit the amount the auxiliary axle can be lifted from the roadway.

These and other features and advantages of the invention disclosed herein will become more apparent upon consideration of the following specification and accompanying drawings wherein like characters of reference designate corresponding parts throughout the several views and in which:

BRIEF DESCRIPTION OF ILLUSTRATIVE EMBODIMENTS

FIG. 2 is a side elevational view of the invention with one wheel and tire assembly removed therefrom;

FIG. 3 is a longitudinal cross-sectional view of the invention;

FIG. 6 is an enlarged cross-sectional view of the front end of one of the torque arm assemblies taken along line 6—6 in FIG. 4;

FIG. 7 is an enlarged cross-sectional view of the rear end of one of the torque arm assemblies taken along line 7—7 in FIG. 5;

FIG. 8 is a cross-sectional view taken along line 8—8 in FIG. 7;

FIG. 9 is an enlarged transverse cross-sectional view of the lift assembly taken along line 9—9 in FIG. 5; and, FIG. 10 is an enlarged longitudinal cross-sectional view of the lift assembly taken along line 10—10 in FIG. 5.

These figures and the following detailed description disclose specific embodiments of the invention, however, it is to be understood that the inventive concepts are not limited thereto since they can be incorporated in other forms.

DETAILED DESCRIPTION OF ILLUSTRATIVE EMBODIMENTS

Referring to the figures, it will be seen that the auxiliary axle assembly 10 is adapted to be mounted on a wheeled vehicle, here shown as a truck T. The truck T has a main frame F including a pair of spaced apart longitudinally extending frame side members SM which mount the main truck drive axle units DA thereon so that the truck T is movable along its longitudinal axis $A_T$. The main frame F has a rear end RE where the side members SM terminate. The auxiliary axle assembly 10 may be mounted forwardly or rearwardly of the drive axle units DA. For sake of simplicity the auxiliary axle 10 is only illustrated mounted rearwardly of the drive axle units DA.

Figure 1:
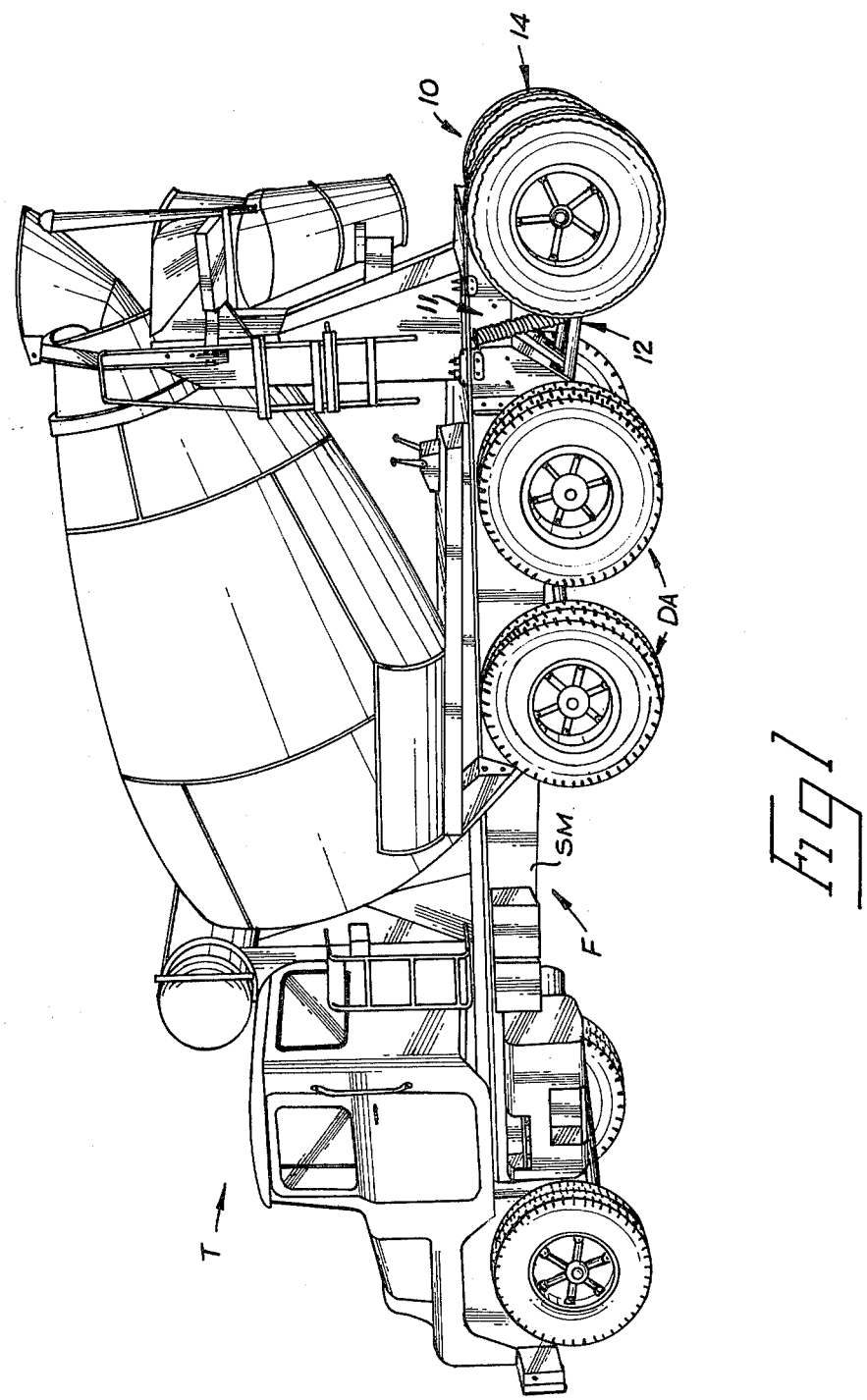
FIG. 1 is a perspective view illustrating the invention installed on a vehicle.
Figure 4:
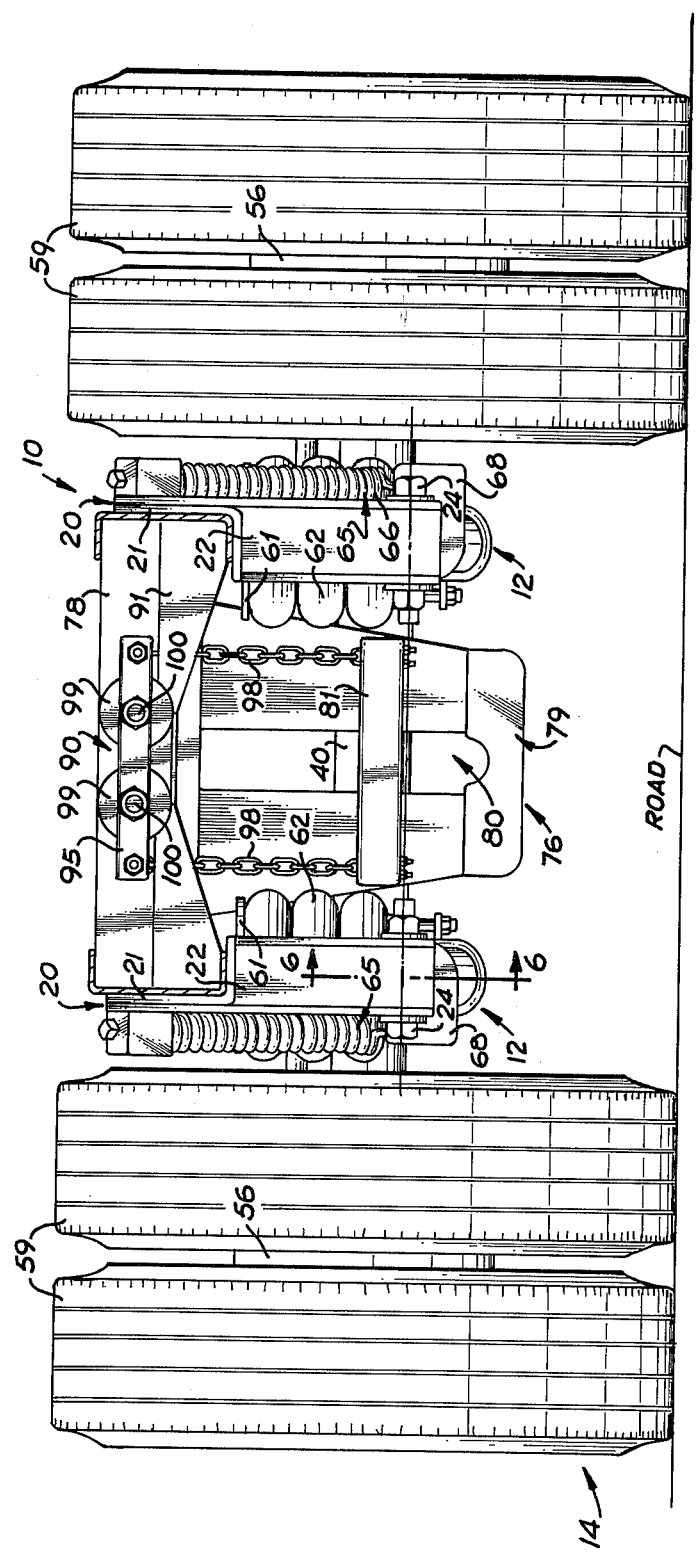
FIG. 4 is a front view of the invention showing the vehicle frame in transverse cross-section.

The auxiliary axle assembly 10 comprises generally an auxiliary support frame assembly 11 mounted on the side members SM of the main frame F as seen in FIGS. 2-4. The auxiliary frame assembly 11 pivotally mounts a pair of torque arm assemblies 12 thereon which project rearwardly under the side members SM. The torque arm assemblies 12 mount a wheel and axle assembly 14 therebetween behind the rear end RE of the truck frame F. Positioning means 15 is provided for selectively lifting the torque arm assemblies 12 and wheel and axle assembly 14 from contact with the road, and for springing the wheel and axle assembly 14 when it is in contact with the road.

Figure 5:
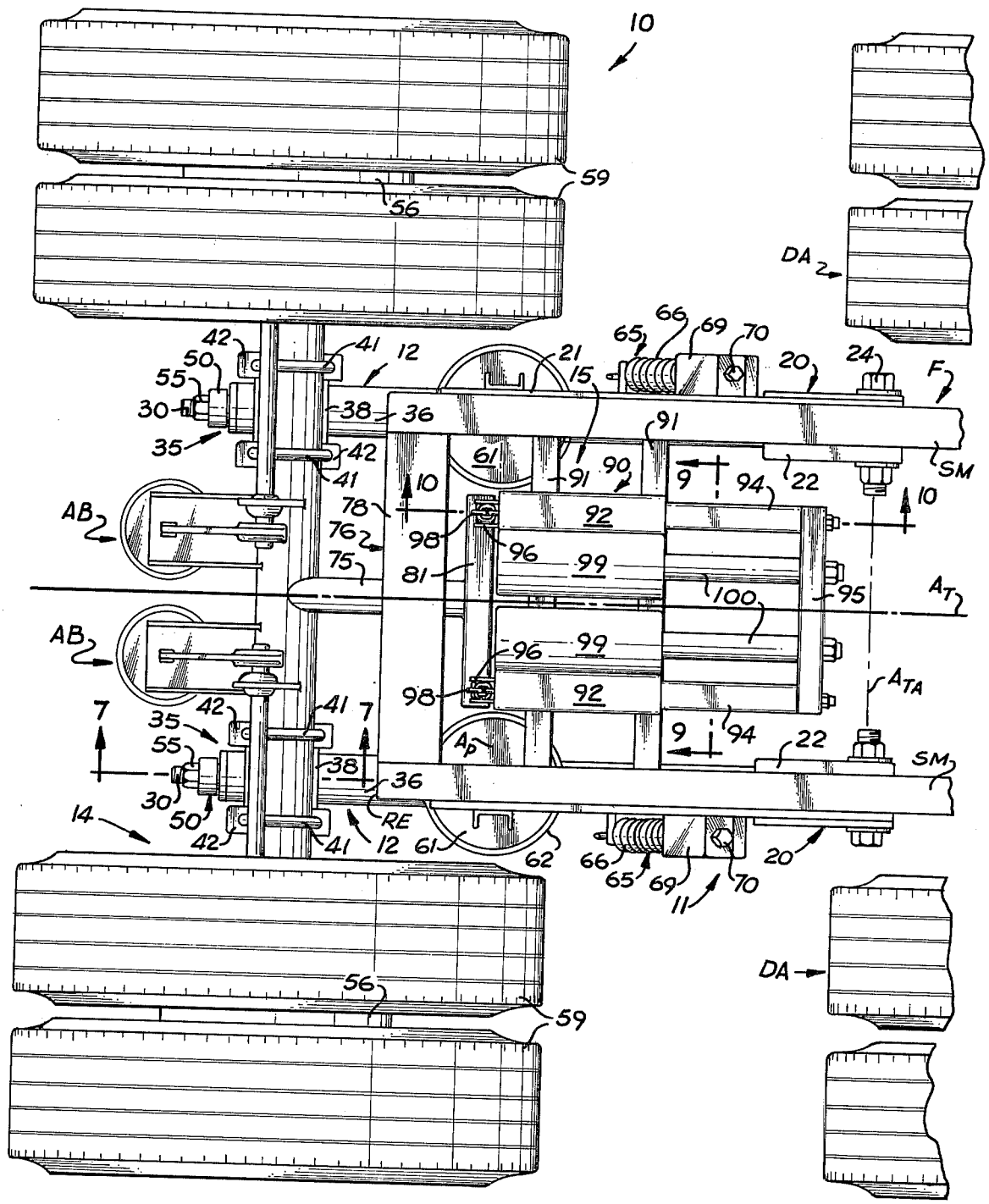
FIG. 5 is a top plan view of the invention.

The auxiliary support frame assembly 11 includes a pair of frame rail supports 20, one being mounted on the outside of each side member SM of the main frame F as best seen in FIGS. 2, 4 and 5. Each frame rail support 20 includes a side plate 21 with an L-shaped cross-section that extends along the outside and under the side member SM. The forward end of the side plate 21 is connected to a support beam 22 which extends downwardly therefrom under the side member SM. The lower end of the beam 22 is provided with a pivot bolt 24 as will become more apparent on which one of the torque arm assemblies 12 is pivoted.

The torque arm assemblies 12 as seen in FIGS. 2 and 3 have the same construction and only one will be described in detail. Each torque arm assembly 12 comprises a tubular torque arm 25 and an axle seat assembly 35. The torque arm 25 as seen in FIGS. 2, 3, 6 and 7 has an elongate cylindrical bearing section 26 with a cross tube 28 at its forward end as seen in FIG. 6. The cross tube 28 mounts a bushing 29 therein. The bushing 29 is rotatably mounted on the pivot bolt 24 carried by frame assembly 11 so that the torque arm 25 is rotatable about a common torque arm pivot axis $A_{TA}$ passing through the centerline of both bolts 24. The rearwardly projecting end 27 of the bearing section 26 is provided with a threaded alignment adjustment stud 30 coaxial with the bearing section 26. The stud 30 has a length $L_1$ projecting from the rear end 27 of torque arm 25 and a diameter smaller than the diameter of the bearing section 26 on the torque arm 25 so that the stud 30 can be inserted into the arm 25 and extend along substantially the entire length thereof. The stud 30 is usually welded to arm 25 at the rear end thereof.

One of the axle seat assemblies 35 is mounted on each of the torque arms 25 which serves to connect the wheel and axle assembly 14 to the torque arms. Each axle seat assembly 35 includes a mounting tube 36 which is slidably and rotatably receivable over the bearing section 26 of the torque arm 25 so that the support tube 36 is concentric about the torque arm centerline $CL_{TA}$. The length $L_2$ of the support tube 36 as seen in FIG. 2 is less than the length $L_3$ of the support section 26 of torque arm 25 as will become more apparent. An upstanding axle seat 38 is fixedly mounted on the support tube 36 adjacent its rear end and extends upwardly therefrom. The upper end of the axle seat 38 is provided wth an upwardly opening axle receiving recess 39 which mounts the axle tube 40 of the wheel and axle assembly 14. The axle tube 40 is usually welded to the axle seat 38. Additionally, a pair of U-bolts 41 may be used to lock the axle tube 40 onto seat 38 in conjunction with the tie plates 42 on opposite sides of the axle seat 38. It will thus be seen that the torque arm 25 can be rotated relative to the axle seat assembly 35 for adjustment as will become more apparent.

A connector 45 is mounted on the rear end of the axle seat assembly 35 for use in positively locating the axle seat assembly longitudinally along the torque arm 25. The connector 25 defines a cutout 46 therein with an opening 48 thereto and a semicircular closed end 49 opposite opening 48. The closed end 49 is centered on the central axis of tube 36 and torque arm centerline $CL_{TA}$ with the width $W_1$ of cutout 46 greater than the diameter $d_1$ of the stud 30 and less than the outside diameter $d_2$ of tube 36.

An internally threaded adjustment member 50 is threadedly received on stud 30 to engage connector 45 and position the axle seat assembly 35. The member 50 is cylindrical with an outside diameter greater than the width $W_1$ of cutout 46 but less than the inside diameter $d_2$ of tube 36. An annular, outwardly opening channel 51 is defined around member 50 intermediate its end with channel 51 lying in a plane transverse of the central axis of member 50. The forward section 52 of member 50 is rotatably received in the rear end of tube 36 with the connector 45 fitting into the channel 51 while the rear section 54 projects rearwardly from tube 36 and connector 45. Thus, it will be seen that the channel 51 captivates the connector 45 therein and thus the axle seat assembly 35 against fore and aft movement with respect to member 50. The projecting rear section 54 can be manually engaged to screw member 50 along the stud 30 to positively position the axle seat assembly 35 longitudinally of the torque arm 25. However, it will be noted that the axle seat assembly 35 can still rotate about the torque arm 25. The rear section 54 may be provided with wrenching surfaces to facilitate this adjustment. A lock nut 55 is provided to lock the member 50 in any desired position on stud 30.

The wheel and axle assembly 14 is conventional with the axle tube 40 extending between the axle seat assemblies 35 and attached thereto. The axle tube 40 projects outwardly past opposite sides of the truck frame side members SM and rotatably mount hub assemblies 56 at opposite ends which rotatably mount rims 58 and tires 59. Air brake units AB are provided to apply the brakes in the hub assemblies 56.

A lower spring seat 60 is mounted on the mounting tube 36 of each of the axle seat assemblies 35 forwardly of the axle seat 38 so that the centerline $CL_{AS}$ of the spring seat 60 is normal to the axle tube 40 carried in axle seat 38. The spring seat 60 is maintained in a fixed relationship with axle seat 38 when torque arm 25 is rotated in the axle seat assembly 35. An upper spring seat 61 is mounted on the lower edge of each side plate 21 so that it is generally vertically aligned with the lower spring seat 60. The positioning means 15 includes a conventional air bag spring 62 attached between each vertically aligned pair of seats 60 and 61 to spring the torque arms 25 and thus the wheel and axle assembly 14.

Each axle seat assembly 35 is also resiliently connected to its associated side plate 21 through an alignment spring assembly 65 that allows the spacing between the side plates 21 to be adjusted over a limited range. Each alignment spring assembly 65 includes an alignment spring 66 connected to the mounting tube 36 of the axle seat assembly 35 forwardly of the lower spring seat 60 by an attachment tab 68. The upper end of the spring 66 is connected to side plate 21 through hanger 69 and hanger bolt 70. Because the mounting tube 36 rotatably mounts the axle seat assembly 35 on the torque arm 25 for rotation about the torque arm centerline $CL_{TA}$ and because the axle tube 40 fixes the seat assemblies 35 with respect to each other, the spacing between the side plates 21 prior to mounting on a truck can be changed by turning bolts 70 to change the rotational force the springs 66 exert on the side plates 21 thus causing the side plates 21 and torque arms 25 to rotate about the torque arm centerline $CL_{TA}$ to move the side plates 21 toward or away from each other. Thus, the side plate spacing can be changed to accommodate different spacings between the truck frame side members SM.

A forwardly projecting alignment tube 75 is provided centrally of axle tube 40 to be used to limit the amount of side-to-side movement of the wheel and axle assembly 14 as the truck turns. Such movement is commonly known as axle walkout. A walkout guide unit 76 seen in FIGS. 3 and 4 is mounted between the side members SM of the truck frame to control the walkout of the wheel and axle assembly 14 through the alignment tube 75. The walkout guide unit 76 includes a cross member 78 which is mounted between the rear ends RE of the side members SM. A U-shaped guide 79 depends from cross member 78 and defines a vertically oriented guide slot 80 therein through which the alignment tube 75 projects. The guide slot 80 is sufficiently wide that the alignment tube 75 can project therethrough while clearing the sides of the slot, but sufficiently narrow for the alignment tube 75 to strike the sides of slot 80 and limit the walkout of wheel and axle assembly 14.

The front end of the alignment tube 75 projecting forwardly of guide unit 76 is provided with a lift plate 81 to be used to lift the wheel and axle assembly 14 and the torque arm assemblies 12 so that the tires 59 of the auxiliary axle assembly 10 clear the road. The positioning means 15 also includes a lift unit 90 mounted between the frame side members SM to lift the wheel and axle assembly 14.

The lift unit 90 is best seen in FIGS. 3–5, 9 and 10 and comprises a support frame 91 which is carried between the side members SM and which mount the chain lift unit 90 centrally of the vehicle frame F. A pair of base tubes 92 are mounted in a spaced apart position on the support frame 91 so that the centerline of the base tubes 92 extend generally parallel to the axis $A_T$ of the vehicle. A pair of extension tubes 94 are slidably mounted in the base tubes 92 so that the extension tubes 94 can be selectively extended from and retracted into the base tubes 92 along paths generally parallel to the axis $A_T$. The forwardly projecting ends of the extension tubes 94 are provided with a cross plate 95 which connects them together so that both of the extension tubes 94 move in unison into and out of the base tube 92. The rear end of the base tubes 92 opposite the ends of the base tubes 92 from which the extension tubes 94 project are each provided with chain pulleys 96. Each of the chain pulleys 96 are rotatably mounted about generally horizontal rotational axes $A_p$ normal to the centerline of the vehicle. A flexible lift member, here shown as chain 98 extends along the length of each of the extension tubes 94 and the base tubes 92 to project out of the rear end of the base tubes 92 over the chain pulleys 96. The front end of each of the lift chains 98 is attached to the cross plate 95 connecting the extension tubes 94 so that the lift chains 98 will be drawn into the base tubes 92 as the extension tubes 94 are extended and allowed to extend from the base tubes 92 over the chain pulleys 96 as the extension tubes 94 are retracted into the base tubes 92. It will be noted that the lift chains 98 move along spaced apart paths generally parallel to the axis $A_T$ of the vehicle and lie in a horizontal plane within the tubes 92 and 94. The chains pass from the horizontal position to the vertical position around the chain pulleys 96 and depend below the chain pulleys 96 where the depending ends of the lift chains 98 are attached to the lift plate 81 on the alignment tube 75 on the wheel and axle assembly 14. Thus, it will be seen that as the extension tubes 94 are extended from the base tubes 92, the lift chains 98 will lift the wheel and axle assembly 14 along with the torque arm assemblies 12 so that the tires 59 on the wheel and axle assembly 14 will be lifted from the road as seen in FIG. 2 or lowered onto the road when the extension tubes 94 are retracted as seen in FIG. 3. A pair of lift cylinders 99 are also mounted on the support frame 91 between the base tubes 92 so that their selectively extendable piston rods 100 project forwardly from the lift cylinders 99 and are connected at their projecting ends to the cross plate 95. Thus, it will be seen that as the piston rods 100 are extended from the lift cylinders 99, the extension tubes 94 will be extended out of the base tubes 92 to cause the lift chains 98 to lift the wheel and axle assembly 14. As the piston rods 100 are retracted, the extension tubes 94 are moved into the base tubes 92 to allow the lift chains 98 to lower the wheel and axle assembly 14 into contact with the road. An appropriate control is provided to charge the air bag springs 62 when the tires 59 on the wheel and axle assembly 14 are in contact with the road to provide the necessary spring connection between the vehicle frame F and the auxiliary wheel and axle assembly 14. While two lift cylinders 99 are illustrated, it is to be understood that these lift cylinders may be replaced by a single lift cylinder.

It will be noted that because the torque arm assemblies 12 are sufficiently long, the axle tube 40 of the wheel and axle assembly 14 rides behind the rear end RE of the vehicle frame F. This allows the lift chains 98 to lift the axle tube 40 of the wheel and axle assembly 14 above the lower edge of the side members SM to provide additional clearance above the road. Normally, the lift provided by auxiliary wheel and axle assemblies is about 8 inches above the road surface whereas this wheel and axle assembly is able to lift the wheel and axle assembly 14 above the road surface to give a clearance of about 12 inches.

When the auxiliary axle assembly 10 is to be mounted on truck frame F, the hanger bolts 70 of the alignment spring assembly 65 are adjusted until the spacing between the side plates 21 on the auxiliary support frame 11 is such that the side members SM of the truck frame F will just fit between the side plates 21. The side plates 21 are then positioned on the side members SM and the holes for the attachment bolts B drilled in side members SM. The bolts B seen in FIG. 2 are installed to attach the side plates 21 to side members SM and thus mount the auxiliary axle assembly 10.

The lock nuts 55 are then loosened and the adjustment members 50 screwed on the studs 30 until the wheel and axle assembly 14 is properly aligned with the truck axis $A_T$. The lock nuts 55 are then retightened to lock members 50 in place.

The walkout guide unit 76 is then installed between the rear ends RE of the truck frame side members SM. The chain lift unit 90 is also installed between side members SM so that the chain pulleys 96 are generally vertically oriented over the lift plate 81. The lift chains 98 are connected to the lift plate 81. The cylinders 99 are connected to the air supply on the truck as well as the air brake units AB and the air bag springs 62. The unit is now ready for use.

What is claimed as invention is:

1. An auxiliary axle assembly for a wheeled vehicle having a vehicle frame and movable along its longitudinal axis comprising:

an auxiliary support frame assembly for connection to the vehicle frame;

a pair of spaced apart torque arms pivotally mounted on said support frame assembly about a common pivot axis generally normal to the longitudinal axis of the vehicle, each of said torque arms including an extending end movable in a generally vertical plane as said torque arms pivot about said common pivot axis, each of said torque arms, including a threaded stud at the extending end thereof, a wheel and axle assembly including an axle, and a pair of wheel and tire assemblies rotatably mounted at opposite ends of said axle;

a pair of axle seat assemblies, one of said axle seat assemblies mounted on each of said torque arms for movement therewith as said torque arms pivot about said common axis, said wheel and axle assembly mounted by said pair of axle seat assemblies so that said axle is generally perpendicular to the longitudinal axis of the vehicle, each of said axle seat assemblies including a support tube slidably receivable on one of said pair of torque arms for axial movement along said torque arm and an alignment connector operatively associated with said support tube;

positioning means for selectively rotationally and resiliently positioning said torque arms about said common pivot axis; and, alignment adjustment means positively interconnecting each of said axle seat assemblies with said torque arm carrying said axle seat assembly for selectively positioning said axle seat assembly axially along said torque arm and longitudinally of the vehicle to adjust the orientation of said axle with respect to the longitudinal axis of the vehicle, said alignment adjustment means including an internally threaded member threadedly engaging one of said threaded studs and operatively connected to said support tube of said axle seat assembly associated with said threaded stud so that said axle seat assembly is moved along with and held by said internally threaded member as said internally threaded member is axially moved along said threaded stud when said threaded member is rotated.

2. The auxiliary axle assembly of claim 1 further including lock nut means for selectively locking the rotational position of said internally threaded member with respect to said threaded stud.

3. The auxiliary axle assembly of claim 2 wherein said internally threaded member defines an annular channel therearound generally normal to the axis of said threaded member and wherein said alignment connector on said support tube of said axle seat assembly defines a U-shaped cutout therein so that said alignment connector fits within said annular groove about said threaded member to prevent axial movement of said support tube with respect to said internally threaded member yet allows said internally threaded member to be rotated with respect to said alignment connector.

4. The auxiliary axle assembly of claim 1 further including lift means operatively connected to said wheel and axle assembly to selectively lift said wheel and axle assembly from the ground, said lift assembly comprising a flexible lift member, means for supporting said flexible lift member so that said flexible lift member has a first portion oriented generally parallel to the longitudinal axis of the vehicle and a second portion generally vertically oriented and generally normal to the longitudinal axis of the vehicle, and drive means operatively connected to said first portion of said flexible lift member for selectively moving said flexible member along a path generally parallel to the longitudinal axis of the vehicle, said second portion of said flexible member operatively associated with said wheel and axle assembly so that when said drive means moves said flexible member generally parallel to the longitudinal axis of the vehicle, said second portion of said flexible member moves generally vertically to cause said wheel and axle assembly to be moved with said torque arms about said common pivot axis.

5. The auxiliary axle assembly of claim 1 wherein the vehicle frame includes a pair of longitudinally extending frame side members; wherein said auxiliary support frame assembly includes a pair of frame rail supports, one of said frame rail supports mounted on each of the vehicle frame side members and each of said frame rail suports pivotally mounting one of said torque arms about said common pivot axis; and wherein each of said torque arms pivotally mounts one of said axle seat assemblies thereon about a second pivot axis generally normal to said first pivot axis so that the spacing between said frame rail supports can be varied by pivoting said frame rail supports and said torque arms connected thereto about said second pivot axis to accommodate different spacings between the frame side members on the vehicle.

6. The auxiliary axle assembly of claim 1 wherein the vehicle frame inclues a rear end; wherein said auxiliary support frame is mounted adjacent the rear end of the vehicle frame; wherein said extending end of each of said torque arm assemblies project rearwardly beyond the rear end of said vehicle frame, and wherein said auxiliary axle is located rearwardly of the rear end of the vehicle frame so that the housing of said axle can be lifted above the bottom of said vehicle frame.

7. The auxiliary axle assembly of claim 6 further including guide means connecting said auxiliary support frame assembly and said wheel and axle assembly to permit generally vertical movement of said wheel and axle assembly while preventing movement of said wheel and axle assembly generally transversely of the longitudinal axis of the vehicle in a generally horizontal direction.

8. The auxiliary axle assembly of claim 1 wherein each of said torque arms is tubular and wherein said threaded studs is fixedly mounted inside said torque arm and projects from the extending end thereof, said threaded stud having a length such that said threshold stud extends substantially along the length of said torque arm.

9. The auxiliary axle assembly of claim 1 wherein the vehicle frame includes a rear end; wherein said auxiliary support frame is mounted adjacent the rear end of the vehicle frame; wherein said extending end of each of said torque arm assemblies project rearwardly beyond the rear end of said vehicle frame, and wherein said auxiliary axle is located rearwardly of the rear end of the vehicle frame so that the housing of said axle can be lifted above the bottom of said vehicle frame.

10. The auxiliary axle assembly of claim 9 wherein the vehicle frame includes a pair of longitudinally extending frame side members; wherein said auxiliary support frame assembly includes a pair of frame rail supports, one of said frame rail supports mounted on each of the vehicle frame side members and each of said frame rail supports pivotally mounting one of said torque arms about said common pivot axis; and wherein each of said torque arms pivotally mounts one of said axle seat assemblies thereon about a second pivot axis generally normal to said first pivot axis so that the spacing between said frame rail supports can be varied by pivoting said frame rail supports and said torque arms connected thereto about said second pivot axis to accommodate different spacings between the frame side members on the vehicle.

11. An auxiliary axle assembly for a wheeled vehicle having a vehicle frame and movable along its longitudinal axis comprising:

an auxiliary support frame assembly for connection to the vehicle frame;

a pair of spaced apart torque arms pivotally mounted on said support frame assembly about a common pivot axis generally normal to the longitudinal axis of the vehicle, each of said torque arms including an extending end movable in a generally vertical plane as said torque arms pivot about said common pivot axis;

a wheel and axle assembly including an axle and a pair of wheel and tire assemblies rotatably mounted at opposite ends of said axle;

a pair of axle seat assemblies, one of said axle seat assemblies mounted on each of said torque arms for movement therewith as said torque arms pivot about said common axis and for axial movement therealong, said wheel and axle assembly mounted by said pair of axle seat assemblies so that said axle is generally perpendicular to the longitudinal axis of the vehicle;

positioning means for selectively rotationally and resiliently positioning said torque arms about said common pivot axis; and, a pair of alignment adjustment assemblies, each of said alignment adjustment assemblies including a pair of complimentary threaded adjustment members so that said pair of complimentary threaded adjustment members can be screwed together to affect an infinite axial movement with respect to each other over a prescribed range of axial movement with respect to each other, one of said complimentary threaded adjustment members connected to and axially fixed with respect to one of said torque arms and the other of said complimentary threaded adjustment members axially fixed with respect to said axle seat assembly associated with said torque arm so that, as said complimentary threaded adjustment members are screwed together, an infinite axial movement over said prescribed range is affected between said torque arm and its associated axle seat assembly.

12. The auxiliary axle assembly of claim 11 wherein said positioning means includes a pair of air bag springs, each of said air bag springs extending between one of said axle seat assemblies and said auxiliary support frame so that said air bag springs provide a spring action to said wheel and axle assembly when inflated.

13. The auxiliary axle assembly of claim 11 wherein one of each pair of said adjustment members is axially and rotatably fixed with respect to said torque arm and wherein the other adjustment member associated therewith is axially fixed but rotatable with respect to said axle seat assembly so that said adjustment members can be screwed together.

14. A lift assembly for an auxiliary wheel and axle assembly mounted on a ground supported vehicle about a pivot axis generally normal to the direction of movement of the vehicle so that the wheel and axle assembly can be selectively lifted from engagement with the ground comprising:

a base tubular member having a base central axis and opposed ends fixedly mounted on the vehicle so that the base central axis is generally parallel to the ground and said tubular base member is located above the auxiliary wheel and axle assembly;

an extension tubular member slidably and coaxially mounted in said base tubular member and selectively extendible from one of the ends of said base tubular;

fluid cylinder means having a cylinder central axis fixedly located with respect to said base tubular member and including a selectively extendible piston rod extendible along the cylinder central axis generally parallel to the base central axis, said piston rod connected to said extension tubular member so that as said piston rod is extended from and retracted into said fluid cylinder means, said extension tubular member will be extended from and retracted into said base tubular member;

a pulley rotatably mounted at that end of said base tubular member opposite the end from which said extension tubular member extends about a pulley axis generally normal to the base central axis;

a flexible inextensible lift member with opposed ends trained over said pulley, one end of said lift member depending below said pulley and connected to the auxiliary wheel and axle assembly, and the other end of said lift member extending inside said base tubular member and connected to said extension tubular member, said lift member having a length such that extension of said extension tubular member from said base tubular member lifts the wheels on the wheel and axle assembly out of contact with the ground through said lift member, said pulley and said base tubular member sized so that said base tubular member keeps said lift member trained over said pulley.

15. The lift assembly of claim 14 including a pair of said base tubular members; a pair of said extension tubular members, one of said extension tubular members in each of said base tubular members; a pair of said fluid cylinder means operatively associated with said extension tubular members; a pair of said pulleys, one of said pulleys associated with each of said base tubular members; and a pair of said lift members, one of said lift members associated with each of said base tubular members.

16. An auxiliary axle assembly for mounting at the rear end of a wheel vehicle having a vehicle frame and movable along its longitudinal axis comprising:

an auxiliary support frame assembly mounted on the vehicle frame adjacent the rear end thereof;

a pair of spaced apart torque arms pivotally mounted on support frame assembly about a generally horizontal pivot axis generally normal to the longitudinal axis of the vehicle and located forwardly of the rear end of the vehicle frame, each of said torque arms including an extending end projecting rearwardly of the rear end of the vehicle frame and movable in a general vertical plane as said torque arms pivot about said common pivot axis;

a wheel and axle assembly including an axle and a pair of wheel and tire assemblies rotatably mounted at opposite ends of said axle;

a pair of axle seat assemblies, one of said axle seat assemblies mounted on each of said torque arms for movement therewith as said torque arm pivots about said common pivot axis, each of said axle seat assemblies including an axle seat extending above said torque arm and fixedly mounting said axle thereon so that said axle is located generally perpendicular to the longitudinal axis of the vehicle and is located rearwardly of the rear end of the vehicle frame; and, positioning means for selectively rotationally and resiliently positioning said torque arms about the common pivot axis, said positioning means including a pair of air bag assemblies, one of said air bag assemblies associated with each of said torque arms, each of said air bag assemblies including an upper air bag seat fixedly mounted on said auxiliary support frame assembly forwardly of the rear end of said vehicle frame, a lower air bag seat fixedly mounted on said axle seat assembly forwardly of said axle of said wheel and axle assembly and forwardly of the rear end of said vehicle frame, and an air bag spring mounted between the upper and lower air bag seats so that said wheel and axle assembly is sprung through said air bag spring upon inflation thereof and so that said axle of said wheel and axle assembly can be raised above the lower edges of the vehicle frame rearwardly of the rear end thereof when said air bag springs are deflated.

* * * * *